(12) United States Patent
Adolfsson et al.

(10) Patent No.: US 6,532,897 B1
(45) Date of Patent: Mar. 18, 2003

(54) SANITARY DEVICE FOR DOMESTIC ANIMALS

(76) Inventors: Maria Adolfsson, Lilla Nygatan 20, Stockholm 111 28 (SE); Kai Martin, Lilla Nygatan 20, Stockholm 111 28 (SE)

( * ) Notice: Subject to any disclaimer, the term of this patent is extended or adjusted under 35 U.S.C. 154(b) by 0 days.

(21) Appl. No.: 10/048,742

(22) PCT Filed: Aug. 7, 2000

(86) PCT No.: PCT/SE00/01552
§ 371 (c)(1),
(2), (4) Date: Jan. 30, 2002

(87) PCT Pub. No.: WO01/10194
PCT Pub. Date: Feb. 15, 2001

(30) Foreign Application Priority Data

Aug. 6, 1999 (SE) .................................. 9902854

(51) Int. Cl.[7] .............................................. A01K 1/035
(52) U.S. Cl. ....................................... 119/168; 119/169
(58) Field of Search ................................ 119/168, 169, 119/170, 526

(56) References Cited

U.S. PATENT DOCUMENTS

| | | | |
|---|---|---|---|
| 3,978,818 A | 9/1976 | Heldenbrand | 119/170 |
| 4,646,685 A * | 3/1987 | Arenz | 119/168 |
| 4,739,725 A * | 4/1988 | Fennelly | 119/168 |
| 4,934,316 A * | 6/1990 | Mack | 119/169 |
| 5,482,007 A * | 1/1996 | Kumlin | 119/169 |
| 5,630,377 A | 5/1997 | Kumlin | 119/172 |
| 5,758,601 A | 6/1998 | Dickson | 119/170 |

FOREIGN PATENT DOCUMENTS

EP  0 195 221  12/1989  ............ A01K/1/01

* cited by examiner

*Primary Examiner*—Robert P. Swiatek
(74) *Attorney, Agent, or Firm*—McCormick, Paulding & Huber LLP

(57) ABSTRACT

A sanitary device for domestic animals comprises a container and at least one liquid absorbing unit which is arranged to be placed in the container and which after use is arranged to be removed from the container in order to be replaced by a new liquid absorbing unit. The liquid absorbing unit comprises at least a first liquid absorbing material which, at a procurement occasion, is substantially sheet-shaped and comprises at least one stamped out form. When the liquid absorbing unit is arranged to be used, at least one area of the stamped out form is gripped and lifted upwards whereafter the area is mixed with other areas of the stamped out form, such that an airy layer is formed in the container.

16 Claims, 2 Drawing Sheets

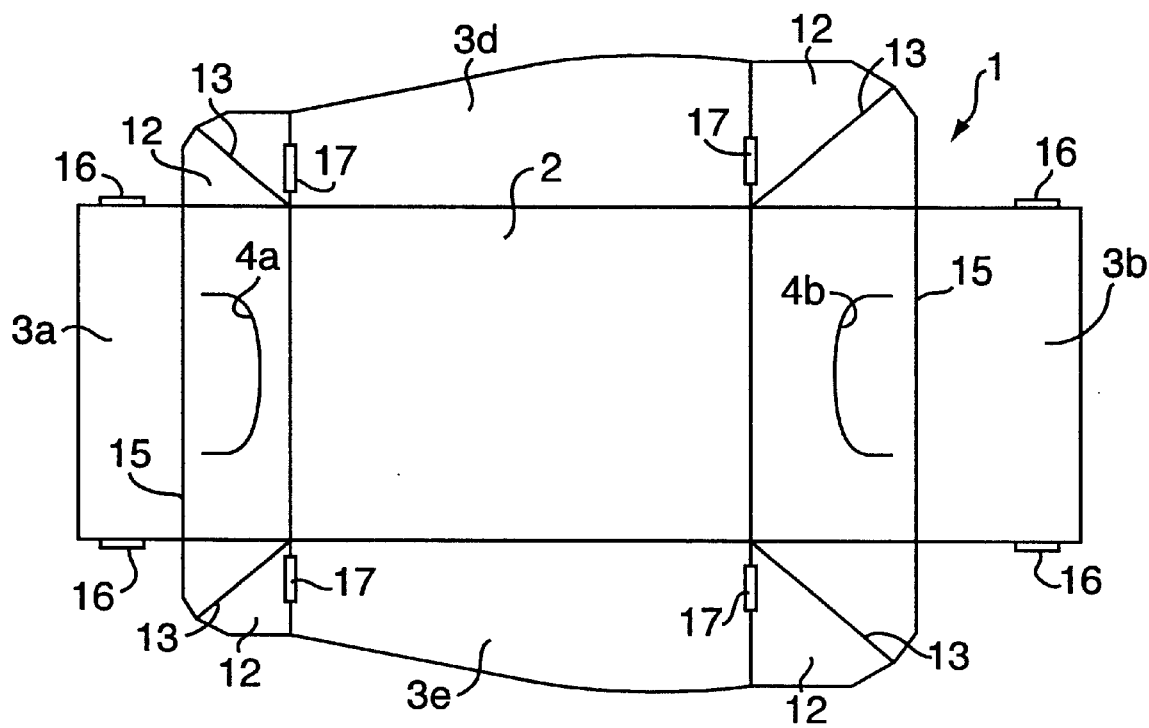
FIG. 4
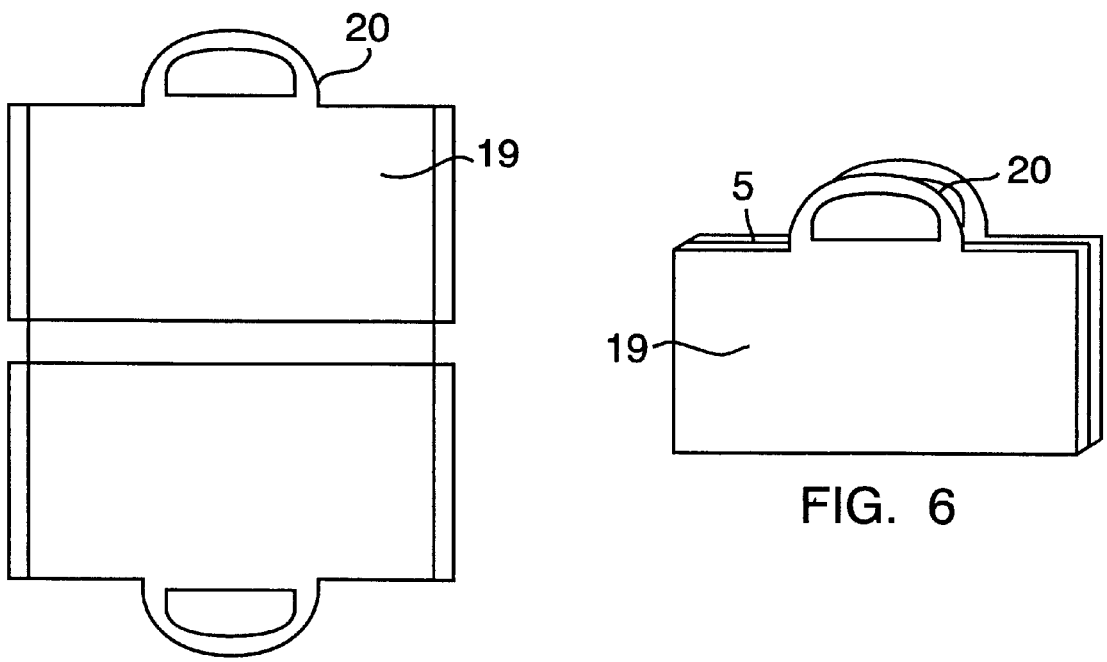
FIG. 5
FIG. 6

SANITARY DEVICE FOR DOMESTIC ANIMALS

BACKGROUND OF THE INVENTION AND PRIOR ART

The present invention relates to a sanitary device for domestic animals, which comprises a container having a bottom portion and side portions extending in a substantially vertical direction upwards from the bottom portion, and at least one liquid absorbing unit, which is arranged to be placed in the container such that it covers at least the bottom portion of the container and which is arranged to be removed from the container after use in order to be replaced by a new liquid absorbing unit.

For cats, which principally are kept indoors, a cat box is usually used in the form of an open container, which is manufactured of a plastic material. This container is arranged to be filled with a liquid absorbing litter material, which usually is cat sand. Such cat sand has the property that it at the same time as it absorbs the liquid from the waste products forms lumps. These lumps are removed from the container whereafter new cat sand is added. A disadvantage with such cat sand is that it is heavy and toilsome to transport home from a shop. Furthermore, it is common that many cat owners flush down used cat sand-in the toilet. This results in a serious wear of the sewage system and in a risk that it gets filled with mud.

From EP 0 195 221 a cat toilet is previously known, which comprises an open container and a bag insertable into the container, which bag is filled with a liquid absorbing litter material. In this document it is not precisely specified which kind of litter material is used. In the case that the litter material is cat sand, such bags are heavy. Therefore, it is not easier to transport home such bags than conventional packages with cat sand. If said bags instead are filled with a lighter kind of litter material, this material usually takes up a relatively large volume. To transport home and store bags filled with conventional litter material is toilsome since a great number of bags are heavy to carry or require a large space.

From U.S. Pat. No. 3,978,818 a sanitary box for different kinds of domestic animals is known. The task of this sanitary box is to find out the state of health of a domestic animal by colour indications. The sanitary box comprises a container and a liquid absorbing unit of a non-usable kind, which is applicable in the container. The liquid absorbing unit has a relatively large volume because of the litter material enclosed in the package.

SUMMARY OF THE INVENTION

The object of the present invention is to provide a sanitary device for domestic animals, preferably for cats, which is simple to transport, hygienic, easy to clean and which constitute a very small load on the environment after use.

This object is achieved by the initially mentioned sanitary device which is characterised in that the liquid absorbing unit comprises at least a first liquid absorbing material which at a procurement occasion is substantially sheet-shaped and comprises at least one stamped out form and that before said liquid absorbing unit is arranged to be used, at least one area of said stamped out form is gripped and lifted upwards whereafter the area is mixed with other areas of said stamped out form such that an airy layer is formed in the container. Since the first liquid absorbing material at a procurement occasion is sheet-shaped, the liquid absorbing unit, which comprises the first liquid absorbing material, may also be made very thin. At a selling place, great numbers of such thin liquid absorbing units may be sold bundled into packages, which are easy to transport home. When the liquid absorbing unit is to be used, an area of the stamped out form of the first liquid absorbing material is lifted up and mixed such that a litter material is formed in the container, which has a considerable extension in a vertical direction. Such a loose litter material, which allows scratching, is necessary in order for a cat to accept a sanitary device. After the use, the liquid absorbing unit is preferably folded up whereafter it is removed from the container. Thereafter a new liquid absorbing unit is folded up in the container. The new liquid absorbing unit may already thereby be positioned in the container under the used one or may be placed there after that the used one has been removed. To clean the sanitary device is therefore very simple and requires only a short time.

According to a preferred embodiment of the present invention, said stamped out form forms at least one elongated portion. With such an elongated portion an airy layer is easily formed when different areas of the elongated portion are mixed together. Advantageously, said elongated portion has a helical extension. One single elongated portion with one such helical extension may be stamped out in a sheet-shaped material. Possibly, several such helical stamp outs may be provided in the same sheet-shaped material. Advantageously, said first liquid absorbing material comprises a paper material. Preferably, this paper is manufactured of waste paper.

According to another preferred embodiment of the present invention, said liquid absorbing unit comprises a second liquid absorbing material provided under the first liquid absorbing material. The task of such a second liquid absorbing material is to absorb the liquid, which passes through the first airy liquid absorbing material. Thereby, a very safe absorption of the liquid is guaranteed. Advantageously, said second liquid absorbing material comprises a plurality of thin liquid absorbing layers provided in parallel. With such thin layers provided over each other, a very effective absorbation of the liquid is achieved. These layers may comprise an absorbing tissue of a soft paper material. Alternatively, said second liquid absorbing material may comprise superabsorbents, which have a very high absorbency in relation to its weight.

According to another preferred embodiment of the present invention, said liquid absorbing unit comprises a casing having a bottom part, which comprises a liquid tight layer and is arranged to abut the bottom surface of the container. With such a bottom part it is guaranteed that the liquid supplied in large quantities during a short time period does not pass through the liquid absorbing unit. Thereby, the liquid is prevented to reach the container and it therefore does not become nasty smelling. Since the liquid can not pass through the bottom part, the liquid absorbing material is allowed to absorb the liquid during a longer time period. Thereby, the absorbed liquid may be dispersed in the liquid absorbing material. Such a liquid tight layer may, for example, comprise a wax layer or a lacquered moisture barrier. Advantageously, said casing comprises at least one side part, which is arranged to abut one of said side portions of the container. By means of such a side part, the corresponding side portion of the container is prevented from getting into direct contact with the excrement material of the domestic animal. Said side parts may be foldable over the first liquid absorbing layer. Preferably, the folded down side parts cover substantially the entire liquid absorbing material such that it principally may be completely enclosed. That is partly an advantage for unused liquid absorbing units since such a casing protects the liquid absorbing material from, for example, moisture. Such an enclosure is also an advantage for used liquid absorbing units since the handling of the used liquid absorbing unit is facilitated when the excrement material does not risk to fall out. Advantageously, said casing comprises a paper material, which preferably also is manufactured of waste paper. Said liquid absorbing unit may comprise a fastening means, which is provided between the second liquid absorbing layer and the bottom part of the casing. Thereby, the second liquid absorbing layer is maintained safely against said bottom part when, for example, a cat scratches in the container.

According to another preferred embodiment of the present invention, the container is manufactured as a substantially plane shaped unit, which before use is turned up to said container-shape. Such a container, which may be turned up, has a simple construction and may be manufactured at a low cost. The container, which may be turned up, may, for example, be sold together with a package enclosing a plurality of liquid absorbing units. Possibly, the container may be exchanged to a new one when the liquid absorbing units have been consumed. Alternatively, it may be saved and used together with a new set of liquid absorbing units. Advantageously, said container may comprise a cardboard material, which preferably is manufactured of a waste cardboard material. Alternatively, the container may be manufactured of a moulded wood fiber material. The side portions of the container ought hereby to have a shape such that they are inclined slightly outwards. Such containers manufactured in one piece may thereby be stacked in each other. Such a moulded container may at a selling occasion comprise a plurality of stacked liquid absorbing units. Said liquid absorbing units may be releasably glued to each other and to the container.

According to another preferred embodiment of the present invention, the container and the liquid absorbing unit only comprise material, which after use allow for composting, burning or reclamation of waste paper. The container and the liquid absorbing unit may thereby substantially be manufactured of cardboard and paper material, which is manufactured of waste material. Consequently, the sanitary device is inexpensive to manufacture and is harmless to the environment.

BRIEF DESCRIPTION OF THE DRAWINGS

In the following a preferred embodiment of the invention is described as an example with reference to the attached drawings, in which:

FIG. 4 shows a container in a plane-unfolded state, FIGS. 5 and 6 show a carrying device in which liquid absorbing units and containers may be sold and transported.

DETAILED DESCRIPTION OF A PREFERRED EMBODIMENT OF THE PRESENT INVENTION

Figure 1:
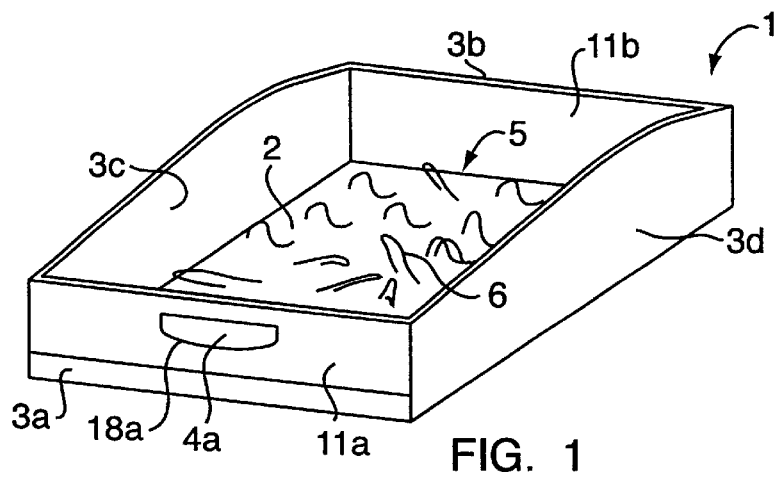
FIG. 1 shows a perspective view of a sanitary device according to the present invention.

FIG. 1 shows a sanitary device for domestic animals, especially for cats. The sanitary device comprises a container 1 having a bottom portion 2, which has a substantially rectangular shape and side portions 3a–d extending in a substantially vertical direction upwards from the bottom portion 2. The container 1 comprises at its two shorter side portions 3a, 3b stamp outs 4a, 4b, of which just one is visible in FIG. 1. A liquid absorbing unit 5 is placed in the container 2. The liquid absorbing unit 5 has at the top a layer of a paper material 6 consisting of elongated narrow strips, which are mixed to an airily loose layer. Said narrow strips 6 are manufactured of waste paper.

Figure 2:
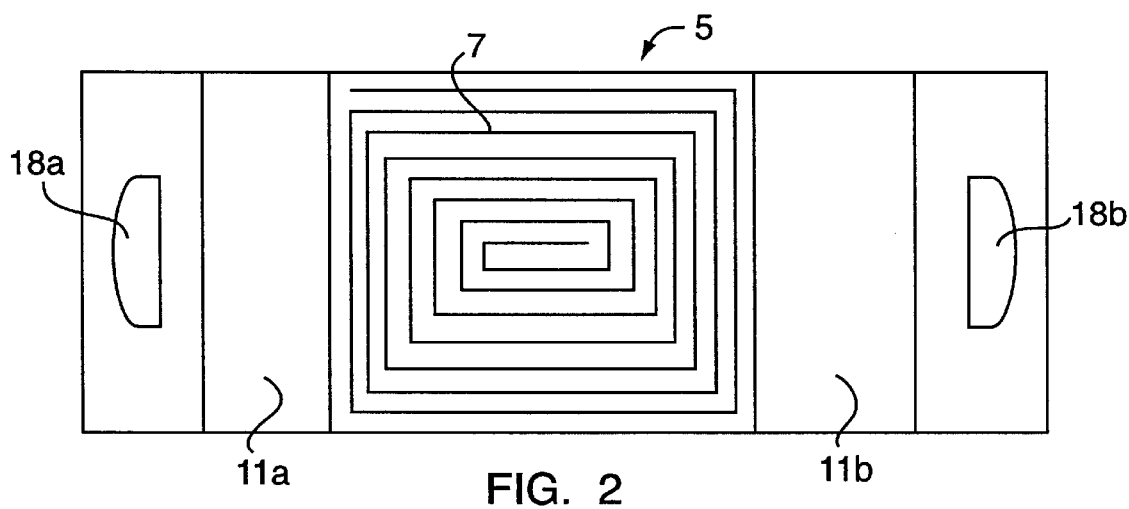
FIG. 2 shows a view from above of a liquid absorbing unit according to the present invention.
Figure 3:
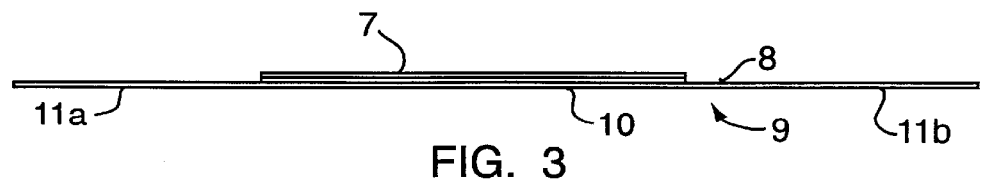
FIG. 3 shows the liquid absorbing unit of FIG. 2 seen from the side.

FIG. 2 shows a liquid absorbing unit 5 at a procurement occasion. The liquid absorbing unit 5 comprises at procurement a first liquid absorbing material 7, which is substantially sheet-shaped and has an extension such that it at least covers a part of the bottom portion 2 of the container 1. The first liquid absorbing material 7 comprises, in this embodiment, a stamped out helical form over its entire extension. The stamp out may extend entirely through the material. Alternatively, said stamp out may only partly extend through the material at some positions such that the helical form is prevented being folded out unintentionally. A second liquid absorbing material 8 is provided under said first liquid absorbing material 7. Said second liquid absorbing material 8 has a corresponding extension to the first liquid absorbing material 7 and it is consequently arranged to cover the bottom portion 2 of the container 1. The second liquid absorbing material 8 comprises a plurality of very thin layers provided in parallel. These layers comprise a tissue of soft paper material having very high liquid absorbing properties. Alternatively, the second liquid absorbing material 8 may comprise superabsorbents, which have a very high liquid absorbing capacity. Furthermore, the liquid absorbing unit 5 comprises an external casing 9. The casing 9 comprises a bottom part 10, which is arranged to be placed to abut the bottom portion 2 of the container 1. A fastening means, for example in form of a glue, is provided between the second liquid absorbing material 8 and the casing 9. Thereby is prevented that the second liquid absorbing material 8 is displaced in the casing 9. Furthermore, the casing 9 comprises side parts 11a, 11b, which are arranged to abut the side portions 3a, 3b of the container 1. The casing 9 comprises a paper material having a liquid tight layer. Such a layer may be a waxed or a lacquered moisture barrier. Advantageously, said liquid tight layer is provided such that it directly abuts the second liquid absorbing layer 8. Thereby is guaranteed that liquid does not penetrate into the paper material of the casing 9, which would then become saturated and soften. Said side parts 11a, 11b also protect the side portions 3a, 3b of the container 1 from getting into direct contact with the excrement material.

FIG. 4 shows the container 1 in an unfolded state. The container 1 is manufactured as a plane unit of a cardboard material. Said plane unit comprises a plurality of folding lines dividing the container 1 into, for example, said bottom portion 2 and side portions 3a–d. The plane unit also comprises four connecting portions 12 having folding lines 13. The connecting portions 12 are provided between adjacent side portions 3a–d. When the container 1 is to be erected, said side portions 3a–d are arranged to be folded upwards. In order to make this possible, each of the connecting portions 12 is folded along its folding lines 13. The side portions 3a–d of the container 1 may thereby be erected such that they obtain a substantially perpendicular extension in relation to the bottom portion 2. The shorter side portions 3a, 3b are divided into an internal and an external area, which are divided by a folding line 15. The external area is arranged to be folded downwards in relation to the internal area by means of the folding line 15 until said areas abut in parallel to each other. In order to retain the shorter side portions 3a, 3b in that folded position, the side portions 3a, 3b comprise projections 16, which are arranged to be displaced into recesses 17 of the longer side portions 3c, 3d. Thereby, a container 1 may be obtained from a substantially plane material unit by a very simple folding method.

In order to releasably fasten a liquid absorbing unit 5 in a turned up container 1, according to the above, the liquid absorbing unit 5 is initially placed in the container such that the bottom part 10 of the casing 9 will abut the bottom part 2 of the container. Thereafter, the side parts 11a, 11b of the liquid absorbing unit 5 are folded around the shorter side portions 3a, 3b of the container 1. The side parts 11a, 11b comprise recesses 18a, b, which have a shape, which allows that the stamped out portions 4a, 4b may be folded in through the recesses 18a, 18b. By folding in the stamped out portions 4a, 4b into the recesses 18a, 18b, the liquid absorbing unit 5 is retained in the container 1. The liquid absorbing unit 5 is thereby releasably retained in the container 1 in a simple manner also when a cat scratches in the container 1.

FIGS. 5 and 6 show a folder 19, which is manufactured of a plane foldable cardboard material in one piece. The folder 19 comprises carrying handles 20 and the folder 19 forms in a folded state an inner space which is intended to contain a plurality of liquid absorbing units 5 or such together with an container 1, which may be turned up. Such a folder 19 filled with liquid absorbing units 5 and possibly a container 1, may be bought at a selling place and these may thereby in a simple manner be transported home in the folder 19. Since the first and second liquid absorbing materials 7, 8 and the casing 9 of the liquid absorbing units 5 are very thin, such a folder 19 may contain a relatively large number of liquid absorbing units 5 arranged in parallel. Since the liquid absorbing units 5 further comprises a light material, which preferably is cardboard and paper material, such a folder 19 with liquid absorbing units 5 is also relatively light to carry.

In order to procure a sanitary device, according to the present invention, a folder 19 initially may be bought containing a container 1, for example in form of a cardboard box material, having a plurality of liquid absorbing units 5. When the sanitary device is to be used, the cardboard box material is turned up such that it forms said container 1. Thereafter, the liquid absorbing units 5 are placed over each other in the container such that its bottom parts 10 are placed over the bottom portion 2 of the container 1. Then, the liquid absorbing unit 5, provided on the top stack, is mounted releasably in the container 1, in the above mentioned manner, by means of said stamped out portions 4a, 4b which are inserted into the recesses 18a, 18b. Thereafter, at least an area of the helical stamp out in the first liquid absorbing material 7 is gripped and lifted upwards such that an elongated helical narrow strip is released from the originally plane sheet material. The released elongated narrow strip is deformed and mixed by means of a few simple manipulations until an airy layer is formed. This airy layer of the first liquid absorbing material 7 has a considerably larger extension in a vertical direction than the originally plane sheet material. Thereby, the sanitary device is ready for use by, for example, a cat.

After that the sanitary device has been used, the liquid absorbing unit 5 is released from the container 1 in that the stamped out portions 4a, 4b of the container 1 are folded out of the recesses 18a, 18b. The released side parts 11a, 11b of the liquid absorbing unit 5 are then folded down over the first liquid absorbing material 7, which contains the refuse material. Thereby, the first and second liquid absorbing materials 7, 8 are substantially entirely enclosed such that the excrement material of the domestic animal is safely retained inside the casing 9 of the folded liquid absorbing unit 5. A person cleaning the sanitary device does thereby not risk getting into direct contact with the excrement material. Thereafter, the liquid absorbing unit 5 may be composted, burned or delivered to reclamation of waste paper. A new liquid absorbing unit is then turned up in the container in the above-mentioned manner.

The present invention is not in any way restricted to the embodiment shown in the drawings but may be varied freely within the scope of the claims. For example, the rechangeable liquid absorbing units 5 may be placed in other types of containers than the foldable one shown in FIG. 4. It is also possible to place such rechangeable liquid absorbing units 5 in conventional plastic containers intended for cat sand. Furthermore, said stamping outs in the first liquid absorbing material 7 may form other for the object suitable shapes than helical lines.

What is claimed is:

1. A sanitary device for domestic animals, which comprises a container having a bottom portion and side portions extending in a substantially vertical direction upwards from the bottom portion, and at least one liquid absorbing unit arranged to be placed in the container such that it covers at least the bottom portion of the container and is arranged to be removed from the container after use in order to be replaced by a new liquid absorbing unit, the at least one liquid absorbing unit comprises at least a first liquid absorbing material which at a procurement occasion is substantially sheet-shaped and comprises a single continuous stamped out form having at least one elongated portion, and that after procurement and before said at least one liquid absorbing unit is arranged to be used, area of said at least one stamped out form is gripped and lifted upwards whereafter the area is mixed with other areas of said stamped out form that have also been gripped and lifted; said areas being self supporting to form an airy layer.

2. A sanitary device according to claim 1, wherein said at least one elongated portion has a helical extension.

3. A sanitary device according to claim 1, wherein said first liquid absorbing material comprises a paper material.

4. A sanitary device according to claim 1, wherein said at least one liquid absorbing unit comprises a second liquid absorbing material provided under the first liquid absorbing material.

5. A sanitary device according to claim 3, wherein said second liquid absorbing material comprises a plurality of thin liquid absorbing layers provided in parallel.

6. A sanitary device according to claim 4, wherein said second liquid absorbing material comprises superabsorbents.

7. A sanitary device according to claim 4, wherein said at least one liquid absorbing unit comprises fastening means between the second liquid absorbing layer and the bottom part of the casing.

8. A sanitary device according to claim 1, wherein said at least one liquid absorbing unit comprises a casing having a bottom part, which comprises a liquid tight layer and is arranged to abut the bottom surface of the container.

9. A sanitary device according to claim 8, wherein said casing comprises at least one side part which is arranged to abut one of said side portions of the container.

10. A sanitary device according to claim 9, wherein said at least one side part is foldable over the first liquid absorbing layer.

11. A sanitary device according to claim 8, wherein said casing comprises a paper material.

12. A sanitary device according to claim 1, wherein the container is manufactured as a substantially plane unit, which before use is folded to said container-shape.

13. A sanitary device according to claim 12, wherein the container comprises a paper material.

14. A sanitary device according to claim 1, wherein the container is moulded of wood fibres.

15. A sanitary device according to claim 1, wherein the container and the at least one liquid absorbing unit comprise only materials, which, after use, allow composting, burning or reclamation of waste paper.

16. A sanitary device for domestic animals which comprises a container having a bottom portion and side portions extending in a substantially vertical direction upwards from the bottom portion and at least one liquid absorbing unit to be placed in the container such that it covers at least the bottom portion of the container and is arranged to be removed therefrom after use in order to be replaced by a new liquid absorbing unit, the liquid absorbing unit comprising at least a first liquid absorbing material which at a procurement occasion defines an approximately smooth surface having at least one stamped out form thereon having at least one elongated portion defining a helical extension, and that after procurement before said liquid absorbing unit is arranged to be used, at least one area of said stamped out form is deformed upwardly whereafter the area is mixed with other areas of said stamped out form that have also been deformed said areas being self supporting to form an airy layer.

* * * * *